US012750770B2

(12) United States Patent
Chugh et al.

(10) Patent No.: US 12,750,770 B2
(45) Date of Patent: Sep. 29, 2026

(54) METHOD AND APPARATUS FOR PROVIDING NETWORK ACCESS TO DEVICES IN A WIRELESS COMMUNICATION SYSTEM

(71) Applicant: Samsung Electronics Co., Ltd., Suwon-si (KR)

(72) Inventors: Nikhil Chugh, Noida (IN); Nitesh Suthar, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 18/638,009

(22) Filed: Apr. 17, 2024

(65) Prior Publication Data

US 2025/0150952 A1 May 8, 2025

(30) Foreign Application Priority Data

Nov. 8, 2023 (IN) ............................ 202311076457

(51) Int. Cl.
*H04W 48/18* (2009.01)
*H04W 48/16* (2009.01)

(52) U.S. Cl.
CPC ........... *H04W 48/18* (2013.01); *H04W 48/16* (2013.01)

(58) Field of Classification Search
CPC ....... H04W 8/08; H04W 48/14; H04W 48/16; H04W 48/18; H04W 28/0268
See application file for complete search history.

(56) References Cited

U.S. PATENT DOCUMENTS

| | | | | |
|---|---|---|---|---|
| 2019/0281468 A1 | 9/2019 | Mathison et al. | | |
| 2021/0368347 A1* | 11/2021 | Wang | ...................... | H04W 8/08 |
| 2022/0086864 A1 | 3/2022 | Sabella et al. | | |

(Continued)

FOREIGN PATENT DOCUMENTS

| | | |
|---|---|---|
| CN | 114567936 A | 5/2022 |
| CN | 115580882 A | 1/2023 |

(Continued)

OTHER PUBLICATIONS

Camps-Mur et al., Enabling always on service discovery: Wi-Fi Neighbor Awareness Networking (NAN), CORE, 2015, 8 pages.

(Continued)

*Primary Examiner* — Khoa Huynh
(74) *Attorney, Agent, or Firm* — Nixon & Vanderhye, P.C.

(57) ABSTRACT

The disclosure relates to a 5G or 6G communication system for supporting a higher data transmission rate. Disclosed herein is a method for providing network access to a plurality of wireless by identifying the plurality of wireless devices. The method includes: generating one or more clusters of the identified plurality of wireless devices, based on a service running in each of the plurality of wireless devices; selecting an optimal first type of wireless device as a master node for each of the clusters; dynamically assigning, network slice from a plurality of available network slices to each of the generated one or more clusters, based on one or more service requirements of the one or more wireless devices; detecting, that a new service is running on the one or more wireless devices of a corresponding cluster; and reassigning another network slice to the one or more wireless devices of the corresponding cluster.

20 Claims, 17 Drawing Sheets

(56) References Cited

U.S. PATENT DOCUMENTS

| | | | | |
|---|---|---|---|---|
| 2024/0323748 | A1 * | 9/2024 | Altman | H04W 28/0268 |
| 2026/0129560 | A1 * | 5/2026 | Ianev | H04W 48/14 |

FOREIGN PATENT DOCUMENTS

| | | | |
|---|---|---|---|
| CN | 116017481 | A | 4/2023 |
| EP | 4161143 | A1 | 4/2023 |

OTHER PUBLICATIONS

Dawaliby et al., Adaptive dynamic network slicing in LoRa networks, Future Generation Computer Systems, pp. 697-707, Jan. 21, 2019, ScienceDirect, Elsevier.

* cited by examiner

METHOD AND APPARATUS FOR PROVIDING NETWORK ACCESS TO DEVICES IN A WIRELESS COMMUNICATION SYSTEM

CROSS-REFERENCE TO RELATED APPLICATION

This application is based on and claims priority under 35 U.S.C. § 119 to Indian Patent Application No. 202311076457, filed on Nov. 8, 2023, in the Indian Patent Office, the disclosure of which is incorporated by reference herein in its entirety.

BACKGROUND

Field

The disclosure relates to a field of wireless communication network. For example, the present disclosure relates to a method and system for providing network access to a plurality of wireless devices in a wireless network.

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (low density parity check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (vehicle-to-everything) for aiding driving determination by autonomous vehicles based on information regarding positions and states of vehicles transmitted by the vehicles and for enhancing user convenience, NR-U (new radio unlicensed) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, IAB (integrated access and backhaul) for providing a node for network service area expansion by supporting a wireless backhaul link and an access link in an integrated manner, mobility enhancement including conditional handover and DAPS (dual active protocol stack) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting AR (augmented reality), VR (virtual reality), MR (mixed reality) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using OAM (orbital angular momentum), and RIS (reconfigurable intelligent surface), but also full-duplex technology for increasing frequency efficiency of 6G mobile communication technologies and improving system networks, AI-based communication technology for implementing system optimization by utilizing satellites and AI (artificial intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

According to an example embodiment, a method for providing network access to a plurality of wireless devices in a wireless network is provided. The method includes: identifying the plurality of wireless devices available in a user environment, where the plurality of wireless devices correspond to at least one first type of wireless devices and at least one second type of wireless devices; generating one or more clusters of the identified plurality of wireless devices, based on a service running in each of the plurality of wireless devices, where each of the one or more clusters includes at least one first type of wireless device; selecting an optimal first type of wireless device from the at least one first type of wireless device as a master node, where the optimal first type of wireless device is selected for each of the generated one or more clusters; dynamically assigning, via the selected master node associated with each of the generated one or more clusters, at least one corresponding network slice from a plurality of available network slices to each of the generated one or more clusters, where the at least one corresponding network slice is assigned to the generated one or more clusters based on one or more service requirements of the one or more wireless devices of each of the generated one or more clusters; detecting, based on dynamically assigning the at least one network slice to each of the generated one or more network clusters, that a new service is running on the one or more wireless devices of a corresponding cluster; and reassigning another network slice to the one or more wireless devices of the corresponding cluster, where the other network slice is selected from the plurality of available network slices based on the new service running on the one or more wireless devices.

According to an example embodiment, a system for providing network access to a plurality of wireless devices in a wireless network is provided. The system includes: a memory and at least one processor, comprising processing circuitry, communicatively coupled with the memory. At least one processor, individually and/or collectively, is configured to: identify the plurality of wireless devices available in a user environment, where the plurality of wireless devices correspond to at least one first type of wireless devices and at least one second type of wireless devices; generate one or more clusters of the identified plurality of wireless devices, based on a service running in each of the plurality of wireless devices, where each of the one or more clusters includes at least one first type of wireless device; select an optimal first type of wireless device from the at least one first type of wireless device as a master node, where the optimal first type of wireless device is selected for each of the generated one or more clusters; dynamically assign, via the selected master node associated with each of the generated one or more clusters, at least one corresponding network slice from a plurality of available network slices to each of the generated one or more clusters, where the at least one corresponding network slice is assigned to the generated one or more clusters based on one or more service requirements of the one or more wireless devices of each of the generated one or more clusters; detect, based on dynamically assigning the at least one network slice to each of the generated one or more network clusters, that a new service is running on the one or more wireless devices of a corresponding cluster; and reassign another network slice to the one or more wireless devices of the corresponding cluster, where the other network slice is selected from the plurality of available network slices based on the new service running on the one or more wireless devices.

To further clarify the advantages and features of the present disclosure, a more detailed description will be rendered by reference to various example embodiments thereof, which are illustrated in the appended drawings. It will be appreciated that these drawings depict example embodiments of the disclosure and are therefore not to be considered limiting its scope. The disclosure will be described and explained with additional specificity and detail with reference to the accompanying drawings.

BRIEF DESCRIPTION OF THE DRAWINGS

These and other features, aspects, and advantages of certain embodiments of the present disclosure will be more apparent from the following detailed description, taken in conjunction with the accompanying drawings in which like characters represent like parts throughout the drawings, and in which.

Figure 1:
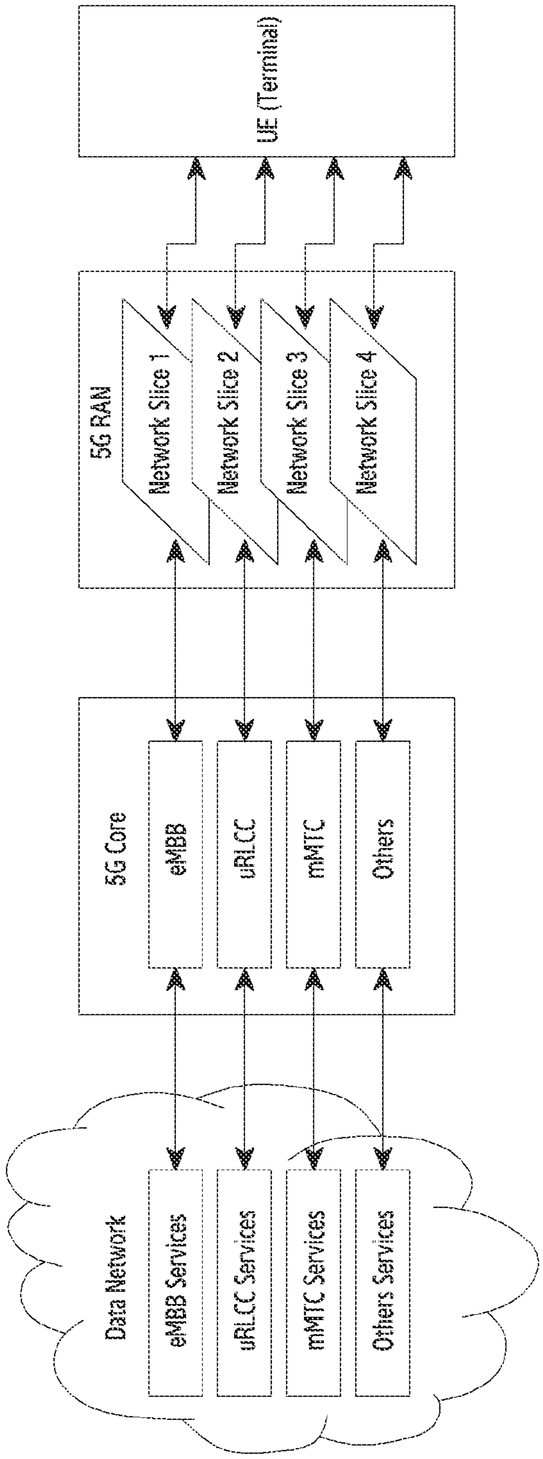
FIG. 1 (RELATED ART)
FIG. 1 is a diagram illustrating an example of the assignment of network slices for various services, according to a conventional technique.

Further, skilled artisans will appreciate those elements in the drawings are illustrated for simplicity and may not have necessarily been drawn to scale. For example, the flowcharts illustrate the method in terms of steps involved to help and improve understanding of aspects of the present disclosure. Furthermore, in terms of the construction of the device, one or more components of the device may have been represented in the drawings by conventional symbols, and the drawings may show those specific details that are pertinent to understanding the embodiments of the present disclosure so as not to obscure the drawings with details that will be readily apparent to those of ordinary skill in the art having the benefit of the description herein.

DETAILED DESCRIPTION

It should be understood at the outset that although illustrative implementations of the various example embodiments of the present disclosure are illustrated below, the present disclosure may be implemented using any number of techniques, whether currently known or in existence. The present disclosure should in no way be limited to the illustrative implementations, drawings, and techniques illustrated below, including the example design and implementation illustrated and described herein, but may be modified within the scope of the appended claims along with their full scope of equivalents.

The term “some” “one or more embodiment” “one or more example embodiments”, as used herein is defined as “one, or more than one, or all.” Accordingly, the terms “one,” “more than one,” “more than one, but not all” or “all” would all fall under the definition of “some.” The term “some embodiments” may refer to one embodiment, several embodiments, or to all embodiments. Accordingly, the term “some embodiments” may refer, for example, to “one embodiment, or more than one embodiment, or all embodiments.”

The terminology and structure employed herein are for describing, teaching, and illuminating various example embodiments and their specific features and elements and do not limit, restrict, or reduce the spirit and scope of the claims or their equivalents.

For example, any terms used herein such as but not limited to “includes,” “comprises,” “has,” “have,” and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language “must comprise” or “needs to include.”

Whether a certain feature or element was limited to being used only once, it may still be referred to as “one or more features”, “one or more elements”, “at least one feature” or “at least one element.” Furthermore, the use of the terms “one or more” or “at least one” feature or element does not preclude there being none of that feature or element unless otherwise specified by limiting language such as “there needs to be one or more . . . ” or “one or more element is required.”

Unless otherwise defined, all terms, and especially any technical and/or scientific terms, used herein may be taken to have the same meaning as commonly understood by one having ordinary skill in the art.

The embodiments herein and the various features and advantageous details thereof are explained in greater detail below with reference to various non-limiting example embodiments that are illustrated in the accompanying drawings and detailed in the following description. Descriptions of well-known components and processing techniques may be omitted so as to not unnecessarily obscure the description with unnecessary detail.

Various example embodiments may be described and illustrated in terms of modules that carry out a described function or functions. These modules, which may be referred to herein as units or blocks or the like, or may include blocks or units, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits of a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, third, etc. may be used herein to describe various elements, these elements should not be limited by these terms. These terms are generally only used to distinguish one element from another.

The terms “device”, “User Equipment (UE)”, and “wireless device” may be used as synonyms interchangeably throughout the description without deviating from the scope of the present disclosure.

The terms “cluster owner”, “owner”, and “master node” may be used as synonyms interchangeably throughout the description without deviating from the scope of the present disclosure.

Various example embodiments of the present disclosure will be described below in greater detail with reference to the accompanying drawings.

The present disclosure provides a system and a method for providing network access to a plurality of wireless devices in a wireless network by dynamically assigning network slices to wireless device clusters in a user environment based on device’s specific needs, including quality of service (QoS) requirements and security considerations. However, after the assignment of the network slice if the QoS or security requirements change for one or more devices in the cluster then reassignment of the network slice to the one or more wireless devices of the corresponding cluster may be made. The dynamic assignment of network slices ensures that each cluster receives a tailored network slice optimized for its characteristics, thereby maximizing and/or improving network resource utilization and providing an improved user experience.

Network slicing is a technique that enables multiplexing of virtualized and independent logical networks on a common physical network infrastructure. In other words, the network slicing enables a creation of multiple virtual networks that may coexist over a common physical network infrastructure. Each network slice is tailored to meet specific requirements of different applications and services, such as mobile broadband, Internet of Things (IoT), mission-critical communication services, etc. By creating customized network slices with specific performance characteristics, network operators can ensure that each application gets the required Quality of Service (QoS) while optimizing the use of network resources. Thus, network slicing allows for greater flexibility, efficiency, and scalability in the deployment of network services, which may ultimately lead to improved user experiences and increased revenue opportunities for service providers.

If the procedure of network slicing is not implemented in the wireless communication network, a scenario might arise where an equal amount of network bandwidth is allocated to every device (for example, a mobile phone), irrespective of the operational state of the device (for example, an idle state, browsing, or streaming videos). Such an allocation of uniform network bandwidth to all devices can result in significant wastage of network bandwidth as the device that has low QoS requirements (like the mobile phone that is in the idle state or browsing) is also allocated high bandwidth that could have been used to support other high QoS requiring devices (like video streaming in mobile phone).

Therefore, with the use of network slicing, the devices that have less QoS requirements may be allocated a network slice with less network bandwidth. Thus, the network slicing will ensure the bandwidth that is saved can be used to support other devices which may result in an efficient utilization of network resources.

FIG. 1 is a diagram illustrating an example of the assignment of network slices for various services, according to a conventional technique. FIG. 1 illustrates network slicing for the fifth generation (5G) network which majorly falls into three categories. The first category is Extreme (or enhanced) Mobile Broadband (eMBB) type of services which are very video-centric services that consume a lot of bandwidth and will generate the most traffic on a mobile network. The second category is Massive Machine-Type Communications (mMTC) type of services which are more commonly known today as the IoT services, but at a much larger scale, with billions of devices being connected to the network. The devices using the mMTC type of services will generate far less traffic than eMBB services or applications. The third category is Ultra-reliable Low-Latency Communications (urLLC) type of services which will allow for things like remote surgery or vehicle-to-X (v2x) communications and require Mobile Network Operator (MNOs) to have mobile edge computing capacity in place.

However, even if the network slice is assigned to an application or service, the network bandwidth or other network resources may still not be fully utilized. Mismanagement of network resources may lead to insufficient network resource availability for the other network slices. Further, the devices that are using Local Area Network (LAN)/Wireless LAN (WLAN) network can not assure Service Level Agreement (SLA) until the device becomes the part of 5G/6G network client. Therefore, network slice SLA's are limited to 5G supported Application/Device only and thus not support and further constrain the devices by not being able to access the network slices, especially for the devices using the services of non-5G or below 5G networks (like 4G). As a result, the quality of the network is compromised and its performance is subpar, which contradicts the purpose of network slicing.

Therefore, in light of the above-mentioned challenges, a solution is required to overcome the above-mentioned challenges associated with the assignment of network slices to the wireless devices in a cluster.

Figure 2:
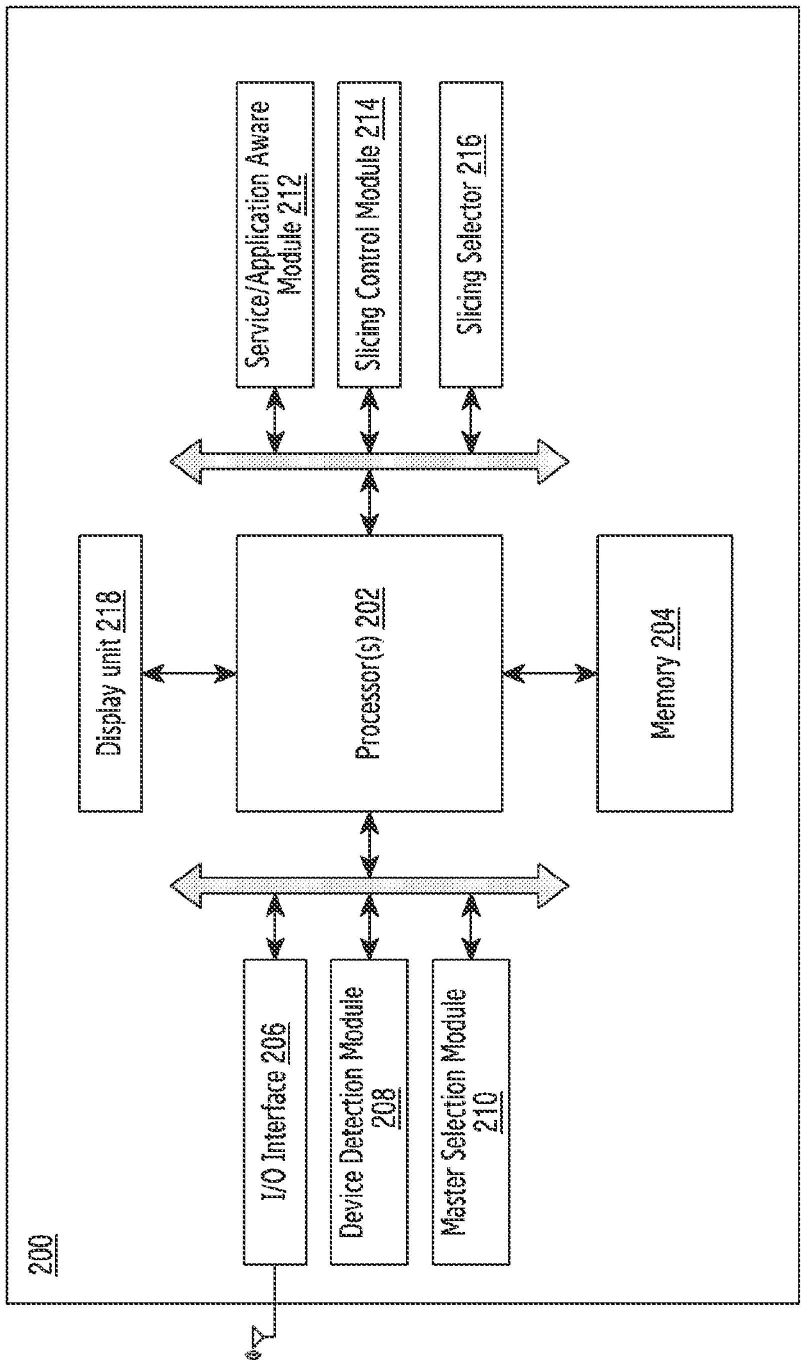
FIG. 2 is a block diagram illustrating an example configuration of a system for providing network access to a plurality of wireless devices in a wireless network, according to various embodiments.

FIG. 2 is a block diagram illustrating an example configuration of a system 200 for providing the network access to the plurality of wireless devices in the wireless network, according to various embodiments. The system 200 includes a processor(s) (e.g., including processing circuitry) 202 (may also be referred to as "one or more processors 202" or "at least one processor 202"), a memory 204, an Input/Output (I/O) Interface (e.g., including various circuitry and/or executable program instructions) 206, a device detection module 208, a master selection module 210, a service/application aware module 212, a slicing control module 214, a slicing selector 216, and a display unit (e.g., including a display) 218. Each of the modules may include various circuitry and/or executable program instructions.

The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204. At this time, the processor 202 may be a general-purpose processor, such as a central processing unit (CPU), an application processor (AP), or the like, and an AI-dedicated processor such as a neural processing unit (NPU). The processor 202 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 202 may, for example, control the processing of input data in accordance with a predefined operating rule or artificial intelligence (AI) model stored in the non-volatile memory and the volatile memory, e.g., the memory 204. The predefined operating rule or artificial intelligence model is provided through training or learning. Further, the processor 202 may be operatively coupled to each of the memory 204, the I/O Interface 206, the device detection module 208, the master selection module 210, the service/application aware module 212, the slicing control module 214, the slicing selector 216, and the display unit 218. The processor 202 may be configured to process, execute, or perform a plurality of operations described herein below in conjunction with FIGS. 3-11 of the drawings.

The memory 204 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The memory 204 is communicatively coupled with the processor 202 to store processing instructions for completing the process. Further, the memory 204 may include an operating system for performing one or more tasks of the system 200, as performed by a generic operating system in a computing domain. The memory 204 is operable to store instructions executable by the processor 202.

The I/O interface 206 may refer, for example, to hardware (e.g., circuitry) and/or software components (e.g., executable program instructions) that enable data communication between the system and the network. The I/O interface 206 serves as a communication medium for exchanging information, commands, or data among the various units of the system. The I/O interface 206 may be a part of the processor 202 or maybe a separate component. The I/O interface 206 may be created in software or maybe a physical connection in hardware. The I/O interface 206 may be configured to connect with the display unit 218, or any other units of the system 200 thereof. The I/O interface 206 may include a connectivity manager for establishing a communication channel between the device and the network.

The device detection module 208 identifies the wireless devices available in the user environment and categorizes the wireless devices as a first type of wireless device (like a 5G supported device) and a second type of wireless device (like a 4G supported device). Accordingly, these identified devices will be divided into the one or more clusters of the identified plurality of wireless devices, based on a service running in each of the plurality of wireless devices.

The master selection module 210, selects a master node in every cluster. The selected master node is an optimal first type of wireless device from the at least one first type of wireless device. The optimal first type of wireless devices are the wireless devices that may support at least one network slice from the plurality of available network slices.

The service/application aware module 212, monitors a current ongoing service in the wireless device and detects if other new requirements (like QoS change in the device) from the application/service in the device are detected that are not met by a current network slice shared by the master node.

The slicing control module 214, detects other requirements from the application/service in the device of the cluster, while the devices in the cluster are using the master node shared network slice resource.

The slicing selector 216, selects a new network slice resource which is accessed by the master node of the corresponding cluster from which the other/new requirements have been detected. The master node shares its new network slice resource with the device having other/new requirements. The new network slice can be from the same master node or the other master node from a different cluster.

The display unit 218 may include a display and is configured to display the content generated by one or more units or components of the system 200. The display unit 218 may include a display screen. In a non-limiting example, the display screen may include Light Emitting Diode (LED), Liquid Crystal Display (LCD), Organic Light Emitting Diode (OLED), Active Matrix Organic Light Emitting Diode (AMOLED), or Super Active Matrix Organic Light Emitting Diode (AMOLED) screen. The display screen may be of varied resolutions.

Figure 3:
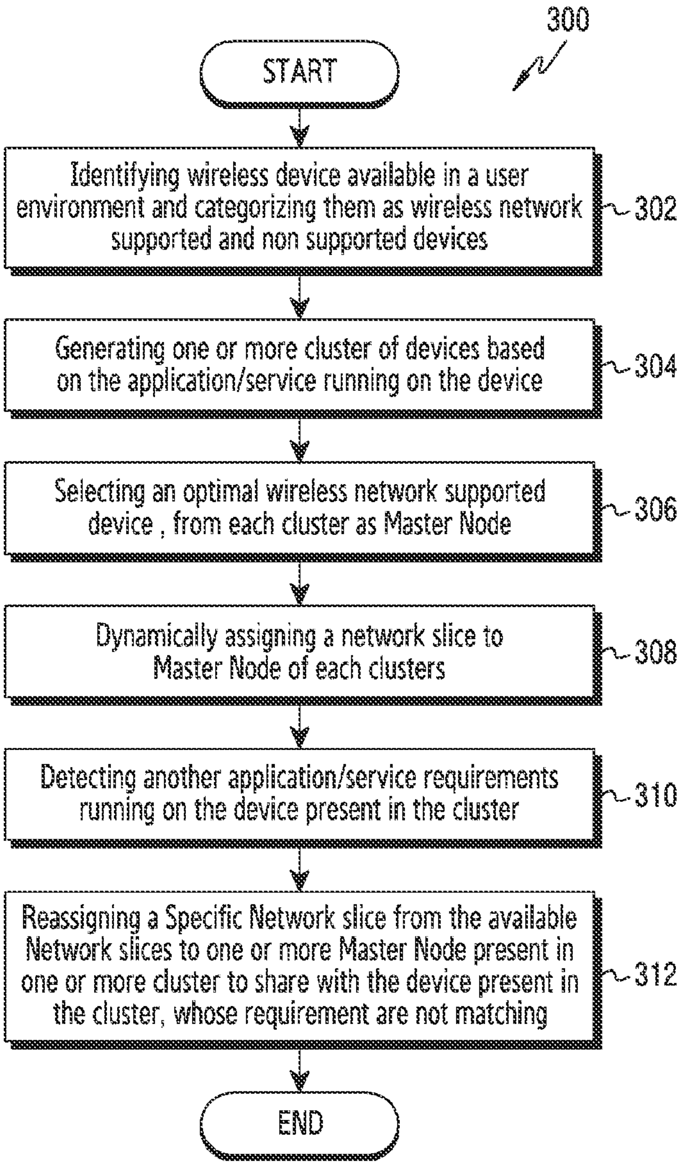
FIG. 3 is a flowchart illustrating an example method for providing network access to a plurality of wireless devices in a wireless network, according to various embodiments.

FIG. 3 is a flowchart illustrating an example method 300 for providing network access to a plurality of wireless devices in a wireless network, according to various embodiments.

The method 300 for providing the network access to the plurality of wireless devices in the wireless network (also referred to as "the method 300" without deviating from the scope of the present disclosure) includes a series of operation steps 302 through 312 of FIG. 3. The operations included in the method 300 may be performed by the one or more components of the system 200, where the processor 202 is controlling each of the respective components of the system 200 using the instructions stored in the memory 204. The method 300 begins at step 302.

At step 302, the processor 202 identifies the plurality of wireless devices available in the user environment, where the plurality of wireless devices may corresponds to at least one first type of wireless devices and at least one second type of wireless devices.

In various embodiments, the one or more first type of wireless devices may be among the wireless devices that support at least one network slice from the plurality of available network slices. Further, the one or more first type of wireless devices may include at least one of 5G supported wireless devices, beyond 5G supported wireless devices or Network functions virtualization (NFV) supported wireless devices.

In various embodiments, the second type of wireless devices may be configured to support only network configuration that excludes the support of any network slice. Further, the at least one second type of wireless devices may include the wireless devices that only support one or more Fourth Generation (4G) network, Third Generation (3G) network, Second Generation (2G) network, Long-Term Evolution (LTE) network, Voice over LTE (VoLTE) network, broadband network, or one or more wireless functionalities, wherein the one or more wireless functionalities comprise Wireless Fidelity (Wi-Fi), Bluetooth, and infrared communication. In an example, the at least one second type of wireless devices are IoT enabled devices supporting the one or more wireless functionalities.

In various embodiments, the plurality of wireless devices available in the user environment communicates with each other over at least one of Wireless Fidelity (Wi-Fi), Bluetooth, or a Neighbor Access Networking (NAN) protocol.

At step 304, the processor 202 generates one or more clusters of the identified plurality of wireless devices, based on a service running in each of the plurality of wireless devices, where each of the one or more clusters may includes at least one first type of wireless device.

At step 306, the processor 202 selects an optimal first type of wireless device from the at least one first type of wireless device as a master node. The optimal first type of wireless device may be selected for each of the generated one or more clusters.

In various embodiments, the selected master node may be used for establishing a connection of a corresponding cluster associated with the generated one or more clusters with a 5G Radio Access Network (RAN).

At step 308, the processor 202 may dynamically assigns, via the selected master node associated with each of the generated one or more clusters, at least one corresponding network slice from a plurality of available network slices to each of the generated one or more clusters. The at least one corresponding network slice may be assigned to the generated one or more clusters based on one or more service requirements of the one or more wireless devices of each of the generated one or more clusters.

In various embodiments, the one or more service requirements may include Quality of Service (QOS) requirement and security requirement of the one or more wireless devices. In an example embodiment, the QoS requirement for assigning network slice 1 to cluster 1 may be low latency and high bandwidth. In an alternative embodiment, the QoS requirement for assigning network slice 2 to cluster 2 may be low bandwidth and high reliability.

At step 310, the processor 202 may detect, upon dynamically assigning the at least one network slice to each of the generated one or more network clusters, that a new service is running on the one or more wireless devices of a corresponding cluster.

At step 312, the processor 202 reassigns other network slice to the one or more wireless devices of the corresponding cluster, wherein the other network slice is selected from the plurality of available network slices based on the new service running on the one or more wireless devices.

In various embodiments, a set of service requirements corresponding to the new service running on the one or more wireless devices is fulfilled by the other network upon reassigning the other network slice to the one or more wireless devices of the corresponding cluster.

In various embodiments, the processor 202 may reassign the second network slice to the one or more wireless devices of the corresponding cluster which may include determining if the selected master node is capable of reassigning the other network slice to the one or more wireless devices. Further, the processor 202 may reassign, upon a determination that the selected master node is capable of reassigning the other network slice to the one or more wireless devices, the other network slice with the similar service requirement to the one or more wireless devices of the corresponding cluster via the selected master node of the same corresponding cluster.

In various embodiments, the processor 202 may reassign the second network slice to the one or more wireless devices of the corresponding cluster which may include determining if the selected master node is capable of reassigning the other network slice to the one or more wireless devices. Further, the processor 202 may reassign, upon determining that the selected master node is not capable of reassigning the other network slice to the one or more wireless devices, the other network slice with the similar service requirement to the one or more wireless devices of the corresponding cluster via the selected master node of another cluster.

Figure 4:
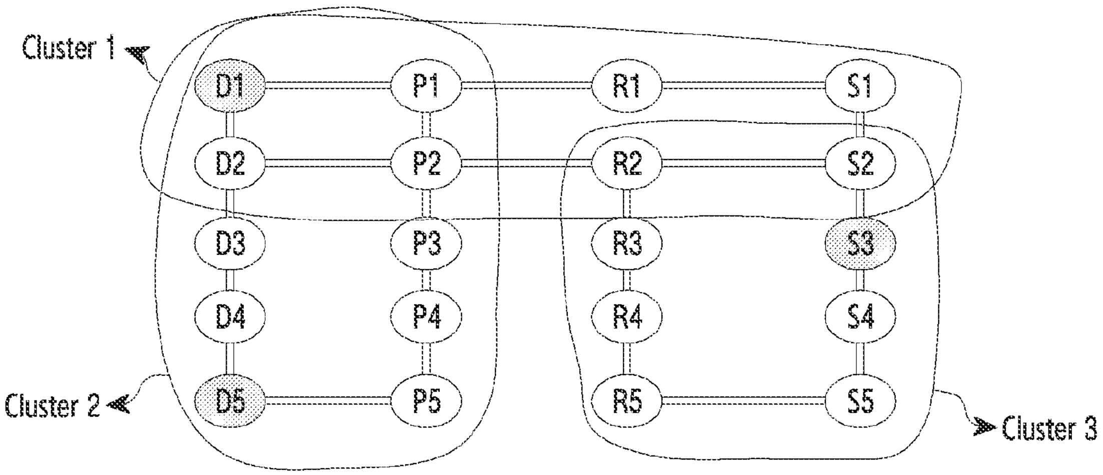
FIG. 4 is a diagram illustrating an example scenario depicting network slices assigned to different clusters, according to various embodiments.

In various embodiments, the processor 202 may detect whether the selected master node left a corresponding cluster of the one or more clusters. Further, the processor 202 may detect other first type of wireless device from the at least one first type of wireless device in the user environment. Subsequently selecting, based on the detection, the other first type of wireless device as a master node of the corresponding cluster FIG. 4 is a diagram illustrating an example scenario depicting network slices assigned to different clusters, according to various embodiments. In the user environment, few devices are present, namely D1-D5, P1-P5, R1-R5, and S1-S5. Among the devices present in the user environment, the devices are identified and categorized between the first type of wireless devices and the second type of wireless devices. Now, three clusters, namely a cluster 1, a cluster 2, and a cluster 3, have been generated from the the identified plurality of wireless devices based on similar service running in each of the plurality of wireless devices. In other words, devices in the cluster 1 may have similar types of services running in every respective device. Similarly, for the cluster 2 and the cluster 3, may have similar types of services running in every respective device. For each cluster, the first type of wireless device may selected as the master node. For the cluster 1, D1 may be selected as the master node having 5G network-supported capabilities. Similarly, D5 is selected as the master node for the cluster 2, and S3 is selected as the master node for the cluster 3. Both D5 and S3 may have 5G network-supported capabilities.

Further, a network slice may be dynamically assigned to the master node of each cluster. A Network slice 1 is assigned to D1 of the cluster 1, a network slice 2 is assigned to D5 of the cluster 2, and a network slice 3 is assigned to S3 of the cluster 3. Network slices have been assigned to each cluster based on one or more service requirements like the QOS requirements and the security requirements of the one or more wireless devices of the corresponding clusters. Accordingly, the master node D1 will share the network slice 1 with the other devices of the cluster 1. Similarly, the master node D5 will share the network slice 2 with the other devices of the cluster 2, and the master node S3 will share the network slice 3 with the other devices of the cluster 3.

Further, in the example embodiment of FIG. 4, it can be seen that cluster 1 and cluster 2 overlap with each other which signifies that the devices D2, P1, and P2 are using the network resources of both network slice 1 and network slice 2. In simpler terms, if an application A1 is running in D2 that requires the network resources like low bandwidth then the appropriate network slice may be shared with D2 which fulfills the requirements of the application A1, like network slice 1 which is shared by the master node D1 of the cluster 1. However, if some other application A2 is running in D2 that requires the network resources like low latency and high bandwidth then the appropriate network slice may be shared with D2 which is fulfilling the requirements of the application A2, like network slice 2 which is shared by master node D5 of cluster 2.

In an example embodiment of FIG. 4, the device S1 of the cluster 1 is using the network slice 1 to meet the present service/application requirements. However, if a new application/service starts running on device S1 and the application/service requirements have not been met by the network slice 1 then the device S1 informs the master node D1 of the cluster 1 that the new requirements have not been met by the shared network slice 1. Accordingly, the master node D1 communicates with the nearby master nodes in the user environment like D5 and S3. If any of the network slices of the D5 (network slice 2) and the S3 (network slice 3) can fulfill the new application/service requirements of the S1 then the corresponding network slice is shared with the device S3. However, if the new application/service requirements of S1 have not been fulfilled by any of the network slices of D5 (network slice 2) and S3 (network slice 3), then the master node D1 will search for the network slice that can fulfill the new application/service requirements of S1 from the plurality of available network slices in the network. If a network slice like a network slice 4 which can fulfill the new application/service requirements of S1, is available then the network slice 4 is assigned to the master node D1. The master node D1 in turn may share the network resources of the network slice 4 with the device S1 of the corresponding cluster.

Figure 5A:
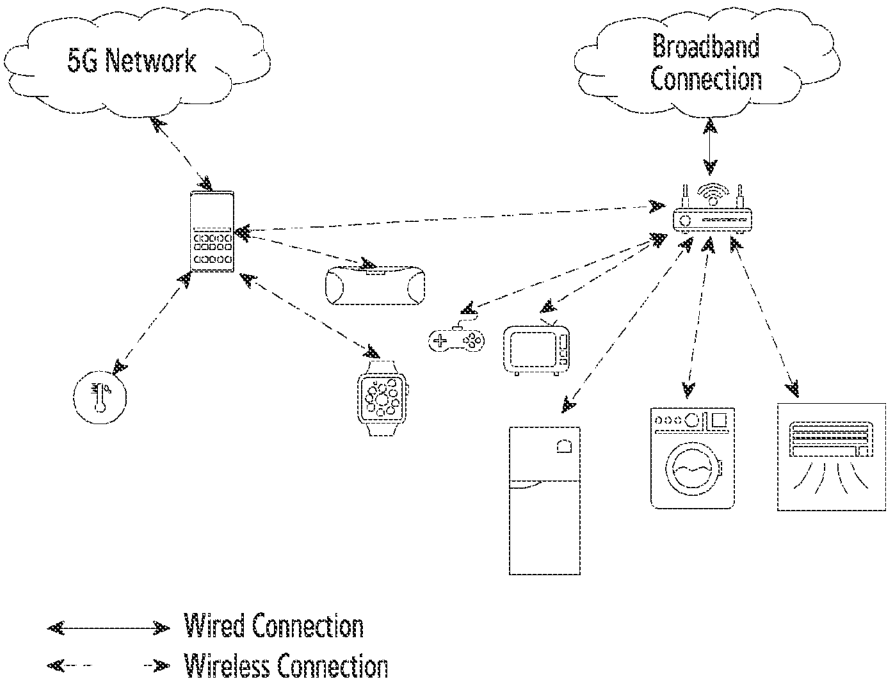
FIG.5A (RELATED ART)
FIG. 5A is a diagram illustrating example scattered connections among available network service provider, according to a conventional technique.

FIG. 5A is a diagram illustrating example scattered connections among available network service providers, according to a conventional technique. FIG. 5A illustrates that the network connection is scattered among different network service providers where a broadband connection provides the network access to different devices without differentiating between the service requirements for each device that is accessing the broadband connection. As an example, service requirements for operating an Air Conditioner (AC) is low bandwidth requirement whereas service requirements for operating a Television (TV) are high bandwidth and low latency requirement. However, as per the conventional technique, a similar amount of bandwidth or the other network resources are equally shared among all the broadband connected devices (including TV and AC) which may lead to the wastage of network resources. A similar condition is also true for mobile devices using the 5G network.

Figure 5B:
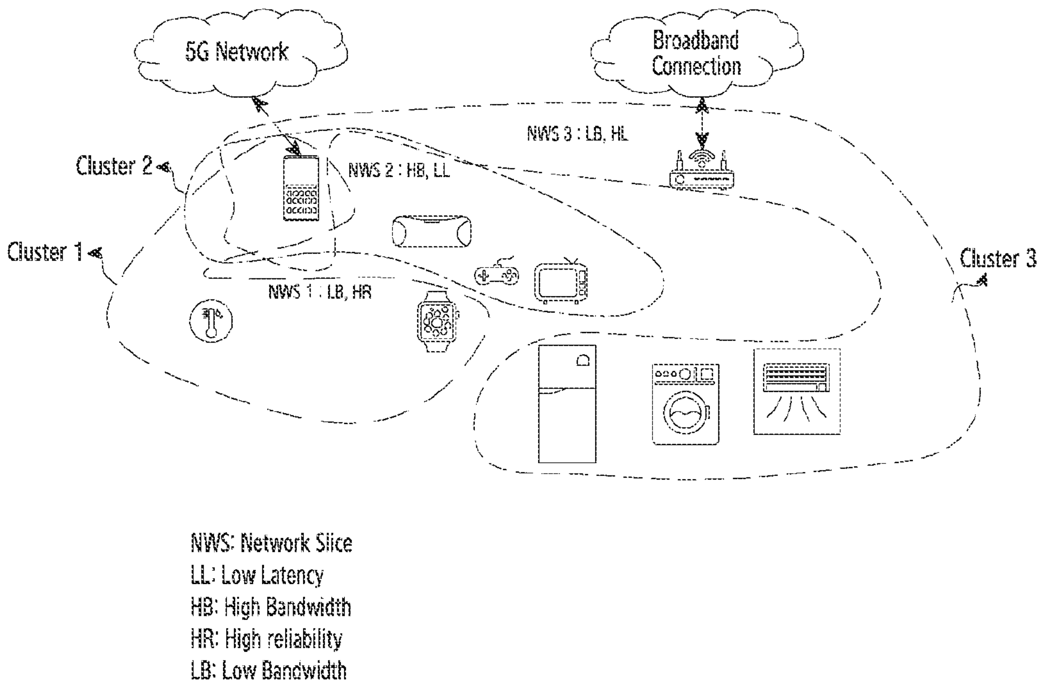
FIG. 5B is a diagram illustrating an example scenario for allotting network slices to a wireless device based on the wireless device requirement, according to various embodiments.

FIG. 5B is a diagram illustrating an example scenario for allotting network slices to a wireless device based on the wireless device requirement, according to various embodiments. FIG. 5B provides an example scenario for overcoming the shortcomings as presented in FIG. 5A. In FIG. 5B, various clusters are formed based on the service requirements for each device. As can be seen the mobile device (5G network supported device) acts as a master node for each of cluster 1, cluster 2, and cluster 3. The mobile device is accessing the different network slices (NWS) namely NWS 1, NWS 2, and NWS 3 from the 5G network. Accordingly, the master node (the mobile device) will share the NWS 1 with cluster 1 where the devices in the cluster 1 have the service requirements of low bandwidth and high reliability which is fulfilled by NWS 1. Similarly, the master node (the mobile device) will share the NWS 2 with cluster 2 where the devices in the cluster 2 have the service requirements of high bandwidth and low latency which is fulfilled by NWS 2. Also, the master node (the mobile device) will share the NWS 3 with the cluster 3 where the devices in cluster 3 have the service requirement of low bandwidth and high latency which is fulfilled by NWS 3. Thus, enabling proper utilization of the network resources via multiple network slices.

Figure 6:
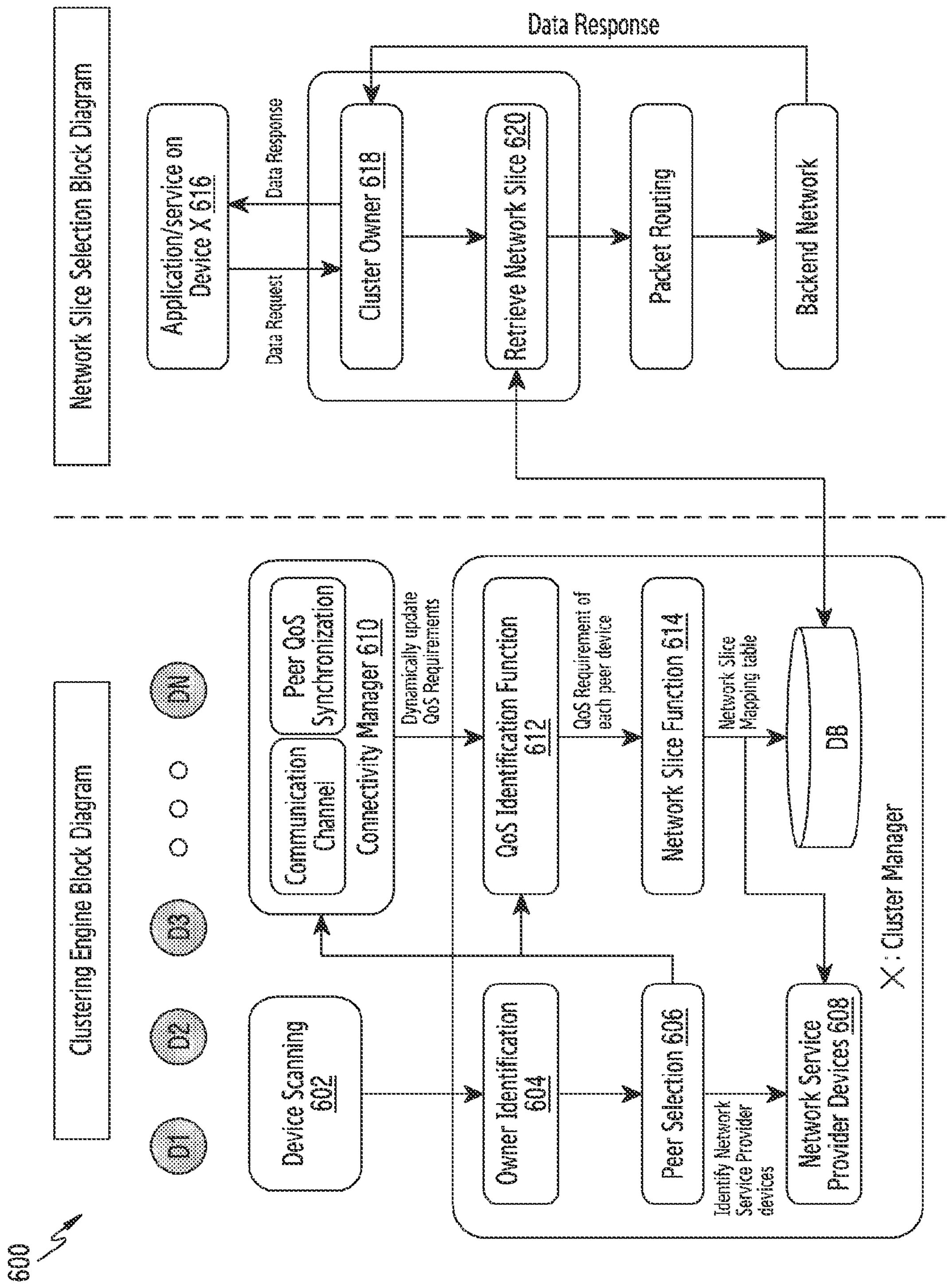
FIG. 6 is a block diagram illustrating an example clustering engine and a selection of a network slice, according to various embodiments.

FIG. 6 is a block diagram 600 illustrating an example clustering engine and a selection of a network slice, according to various embodiments. The block diagram 600 includes a series of operation steps 602 through 624 of FIG. 6. The operations included in the block diagram 600 may be performed by the one or more components of the system 200, where the processor 202 is controlling each of the respective components of the system 200 using the instructions stored in the memory 204. The block diagram 600 begins at step 602.

At step 602, the one or more wireless-supported devices like a 5G supported wireless device scan all the devices in the user environment. Based on the results of scanning, the flow of operation proceeds to step 604.

At step 604, identifying the plurality of wireless devices available in a user environment that can be categorized between first type of wireless network-supported devices (like 5G network-supported devices) or one or more second type of wireless network-supported devices. Accordingly, selecting an optimal wireless network-supported device as a master node or cluster owner for generating the clusters. Further, the first type of device checks if there is any existing master node in the environment. The first type of device either gets to know the master node or in absence of one, it can declare itself as a master node.

At step 606, peers or devices are selected, based on one or more service requirements like QOS requirements and security requirements for each device, for a respective cluster. Further, one or more devices are identified as peers among the plurality of wireless devices which are in vicinity and are capable of communicating with the master node.

At step 608, after performing the peers or devices selection, identification of the network service provider devices maybe provided from the memory of the system.

At step 610, after proceeding from step 606, the connectivity manager may use the communication channels like Wi-FI, Bluetooth or the devices using NAN protocol for establishing the communication between the devices/peers and the master node in the cluster. Further at step 610, a peer/device QoS synchronization is also performed where the peers/devices share their application/service requirements to the master node (cluster owner). When the master node adds a new device to cluster, the new device requests for the supported app/services from the master node.

Further, at step 610, when a change in application/service requirements is made by a device in the cluster, then the same device may notify the master node with the new set of requirements. Based on the new requirement received from the device, the master node identifies the new QoS requirements and moves the device from current cluster to new cluster.

At step 612, a QoS identification function receives the QoS input for every device from step 606 and further keeps on dynamically updating the QoS requirements for each device after the new device has been added to the cluster or the new requirement is received from the device in cluster.

Figure 9:
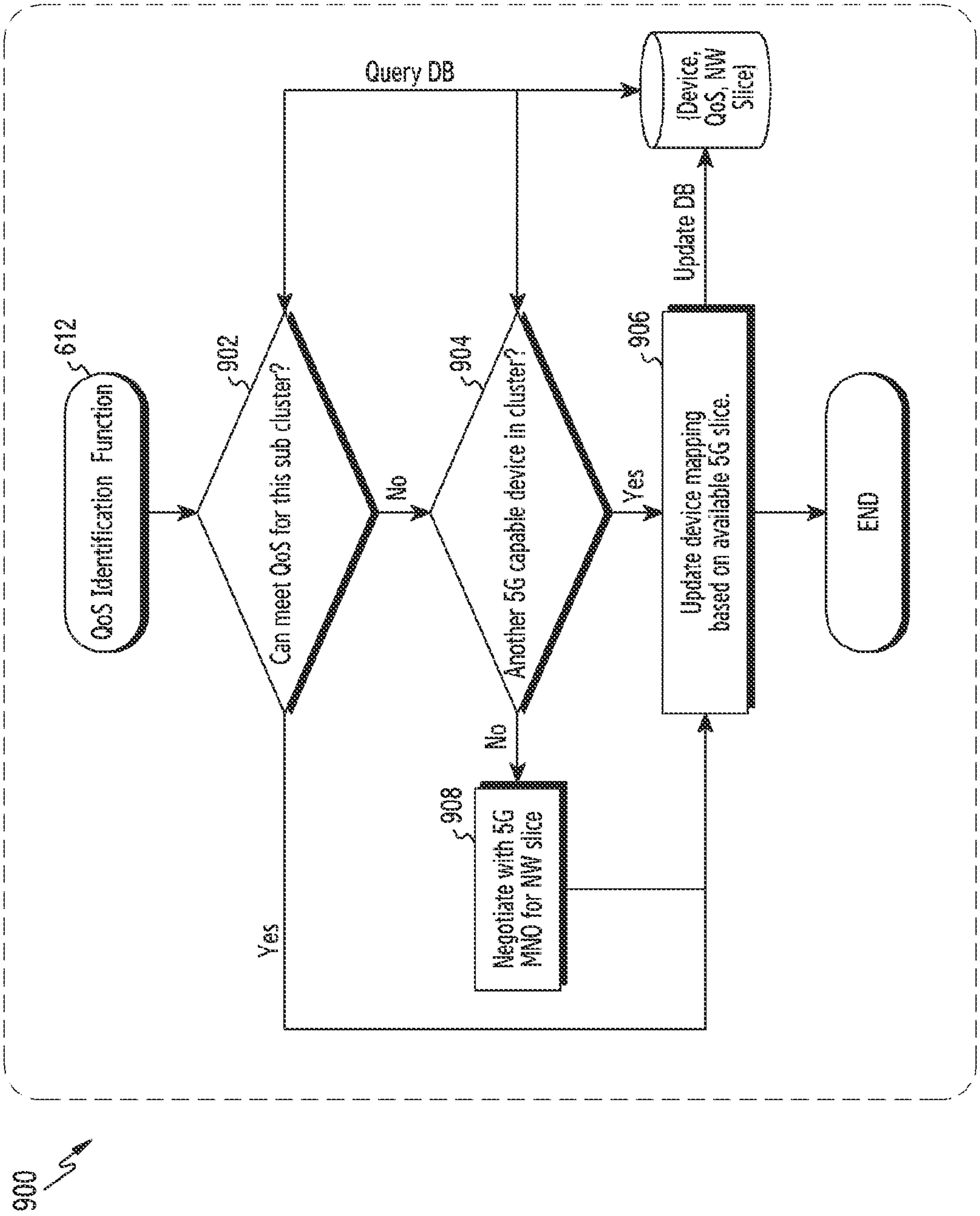
FIG. 9 is a flowchart illustrating an example network slice function, according to various embodiments.

At step 614, QoS requirement of each device from step 612 is provided to a network slice function. The network slice function is described in greater detail below with reference to FIG. 9. For the sake of the clarity and understanding the functionality of the network slice function, FIG. 9 is elaborated here in conjunction with step 614.

At step 902, after receiving the input for QoS requirement of each device from step 612, the network slice function is used by the master node or the cluster owner to map the clusters with actual network slice received from the network like 5G network based on the QoS requirements of the cluster. Further at this step it is determined whether the QoS requirements (new or existing) of the application/service of the device in the cluster can be fulfilled by the network slice allocated to the master node or not. If the existing network slice is able to meet the requirements of application/service of the device in the cluster then the flow will proceed to step 906. However, if the existing network slice is not able to meet the requirements of application/service of the device in the cluster then flow will proceed to step 904.

At step 904, it is further determined whether there is any first type of wireless device (like 5G network-supported device) in any other cluster, having a network slice which can fulfill the new application/service requirements of the device. If the network slice that can fulfill the new application/service requirements of the device is present in any other cluster, then the device with the new application/service requirements may get attached to the master node of that cluster and the flow will proceed to step 906. However, if the network slice that can fulfill the new application/service requirements of the device is not present in any other cluster, then the flow will proceeds to step 908.

At step 908, the existing master node of the cluster, for which the new application/service requirements by the device of the same cluster are not getting fulfilled, will negotiate/request for a new network slice that can fulfil the new application/service requirements by the device from the wireless network like 5G mobile network operator.

At step 906, the device mapping is updated in the memory of the system based on available network slices.

Referring back to step 614 of FIG. 6, the network slice function is explained above in detailed in steps 902 to steps 908 of FIG. 9. The output of the network slice function is dynamically updated in memory of the system.

Referring to the network slice selection block diagram of FIG. 6, where the application/service (new or existing) running on the device 616 and the application/service requirements have not been met by the network slice of the corresponding cluster then the device informs the master node of the same cluster that the present requirements have not been met by the shared network slice. Then the master node 618 checks with the other master nodes of the corresponding clusters and accordingly retrieve the information about the existing network slices from the memory in step 620. However, if the application/service requirements by the device of the cluster are not getting fulfilled by any of the existing network slices with any of the clusters, then the master node will request for a new network slice that can fulfil the application/service requirements by the device from the wireless network like 5G mobile network operator.

Figure 7A:
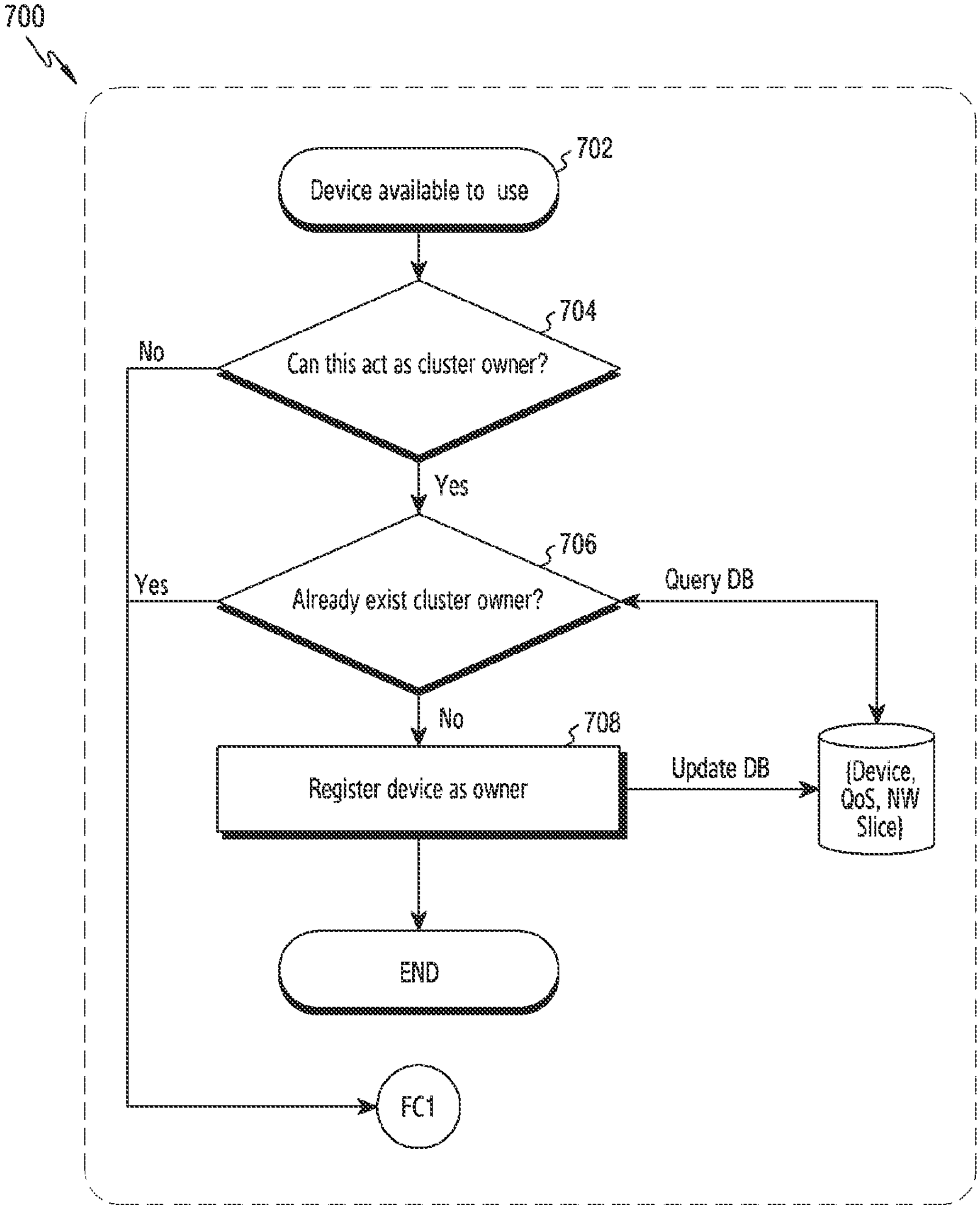
FIGS. 7A, 7B, 7C and 7D are flowcharts illustrating example operations of a system for providing network access to a plurality of wireless devices in a wireless network, according to various embodiments.

FIGS. 7A, 7B, 7C and 7D are flowcharts 700 illustrating an example system for providing network access to a plurality of wireless devices in a wireless network, according to various embodiments. In FIG. 7A, the operations include the steps 702 to 708.

At step 702, the processor 202 may identify the plurality of wireless devices that are available in the user environment where the the plurality of wireless devices correspond to the first type of wireless device and the second type of wireless device.

At step 704, the processor 202 determines whether each of the plurality of wireless devices can become the cluster owner or the master node. If, at the step 704, it is determined that any of the plurality of wireless devices cannot become the cluster owner or the master node then that wireless device will proceed to FC 1. However, if at the step 704, it is determined that that any of the plurality of wireless devices can become the cluster owner or the master node then that wireless device will proceed to the step 706.

At step 706, the processor 202 determines whether the wireless device is already the cluster owner or the master node. If, at the step 706, it is determined that the wireless device from the step 704 is already the cluster owner or the master node by retrieving the information from the memory 204, then that wireless device will proceed to FC 1. However, if at the step 706, it is determined that the wireless device from the step 704 is not the cluster owner or the master node then that wireless device will proceed to the step 708 and further result of the above determination may be updated in the memory 204.

At step 708, as the result from the determination step at step 706, if it is determined that the wireless device is not the cluster owner or the master node then registering that device as the cluster owner or the master node, and the result of the step 708 may be updated in the memory 204. The cluster owner selection process end at the step 708.

Figure 7B:
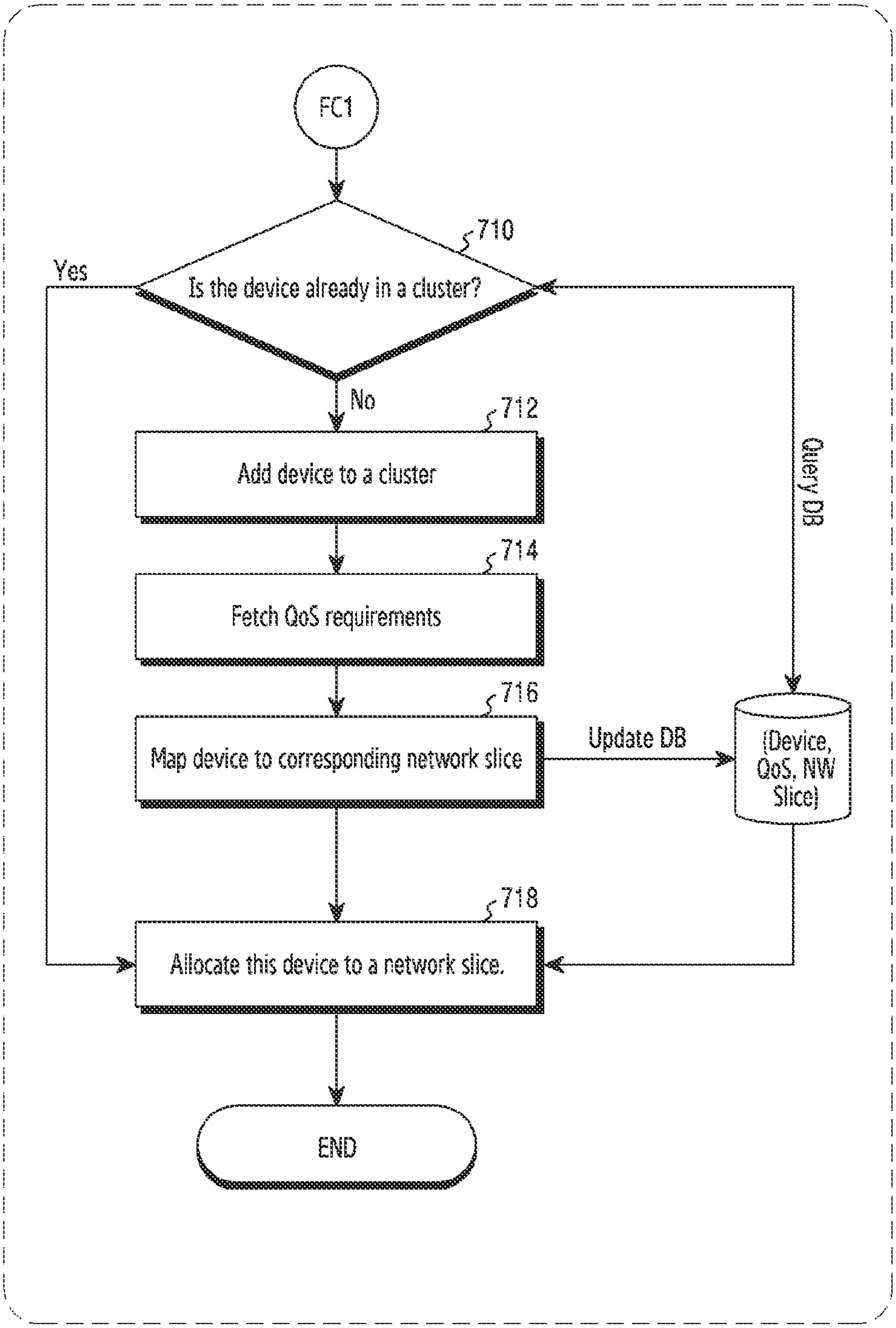

Now coming to FIG. 7B for registering the device to the cluster, where the operations starts from the steps 710 to 718. The operation of the flow begin at the step 710.

At step 710, the results of the determination process followed in steps 704 and 706, where the result of the flow (wireless devices) are pointed to the step FC 1 may be treated as input for the determination process at step 710. At step 710, the processor 202 may determine whether the wireless device is already the cluster by retrieving the relevant information from the memory 204. If, at the step 710, it is determined that the wireless device is already in the cluster, then that wireless device will proceed to step 718. However, if at the step 710, it is determined that the wireless device is not in any cluster then that wireless device will proceed to the step 712. Further, the result of the above determination may be updated in the memory 204.

At step 712, the processor 202, if it is determined that the wireless device is not in any cluster then that wireless device will be added to a cluster.

At step 714, the processor 202 may fetch QoS requirement of the wireless device from step 712.

At step 716, the processor 202, after fetching the QoS requirement from the above step 714, may map the wireless device to a corresponding network slice that can fulfill the QoS requirement of that respective wireless device. Accordingly, the same mapping may be updated in the memory 204.

At step 718, the processor 202, after receiving the result from step 710 where it is determined that the wireless device is already in the cluster, may allocate the wireless device to the network slice. Further, the processor 202, after receiving updated mapping between the wireless device and the corresponding network slice from step 716, may allocate the wireless device to the network slice. Accordingly, the process of registering the wireless device to the cluster terminates here.

Figure 7C:
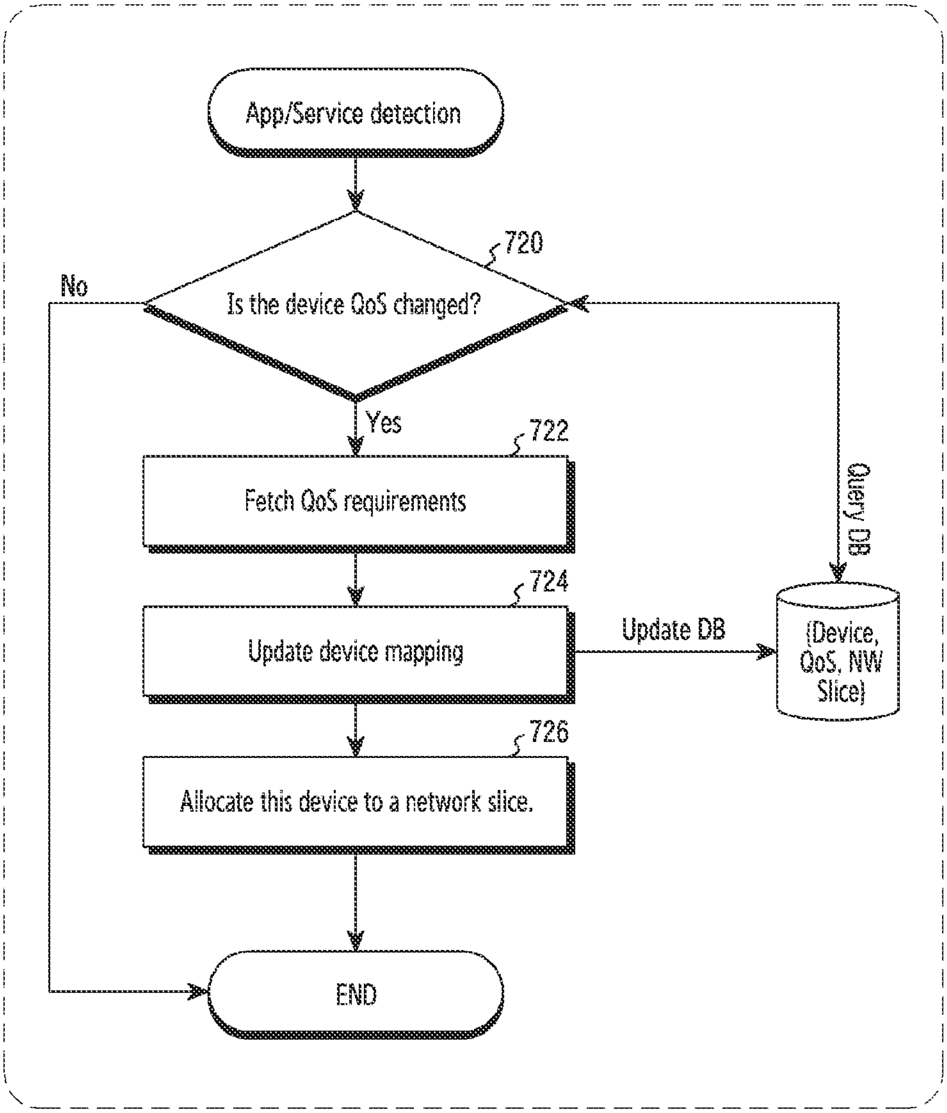

Referring to FIG. 7C for detecting the device's QoS change in the cluster, where the operations include the steps 720 to 726.

At step 720, the processor 202, may determine whether the QoS of the wireless device has been changed or not based on the detection of a new application/service running in the wireless device in the cluster by retrieving the relevant information from the memory 204. If, at the step 720, it is determined that the QoS of the wireless device has not been changed, then then the process of detecting the QoS change may end here. However, if at the step 720, it is determined that the QoS of the wireless device has been changed then that wireless device will proceed to the step 722. Further, the result of the above determination may be updated in the memory 204.

At step 722, the processor 202 may fetch QoS requirement of the wireless device from step 720, based on the determination that the QoS of the wireless device has been changed.

At step 724, the processor 202 will update the mapping of the wireless device with the respective QoS change and may further update the memory 204.

At step 726, the processor 202 may allocate a new network slice to the master node of the corresponding cluster or access a new network slice from at least one of the master nodes of the other clusters having a network slice which can fulfill the QoS requirements of the wireless device. The new network slice, which can fulfill the QoS requirements of the wireless device, may be shared with the wireless device. Accordingly, the process will terminate here.

Figure 7D:
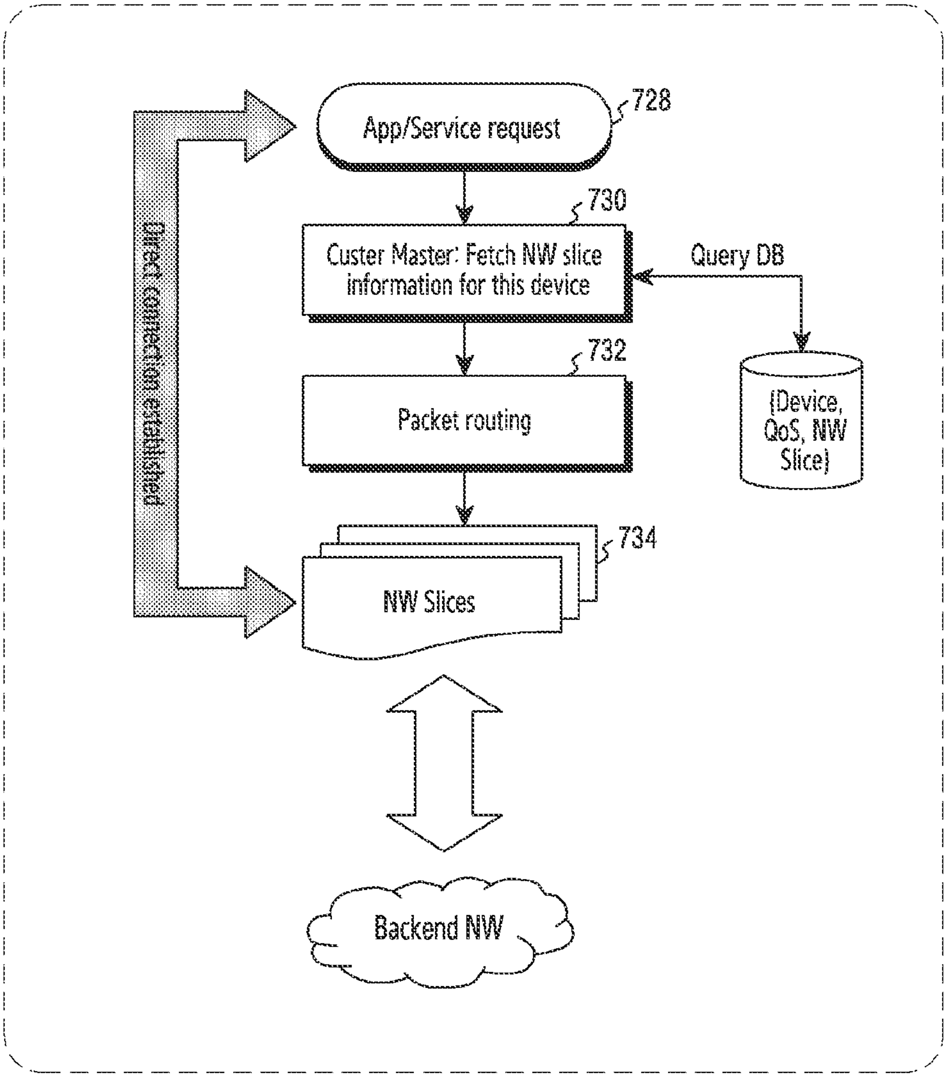

Referring to FIG. 7D for accessing the network slice, where the operations include the steps 728 to 734. The processor 202, on receiving the application/service request in step 728 from the wireless device, may fetch the network slice information from the wireless device in step 730 and checking the mapping from the memory 204. Accordingly, route the packets in step 732 from the wireless device to the corresponding network slice in step 734.

Figure 8:
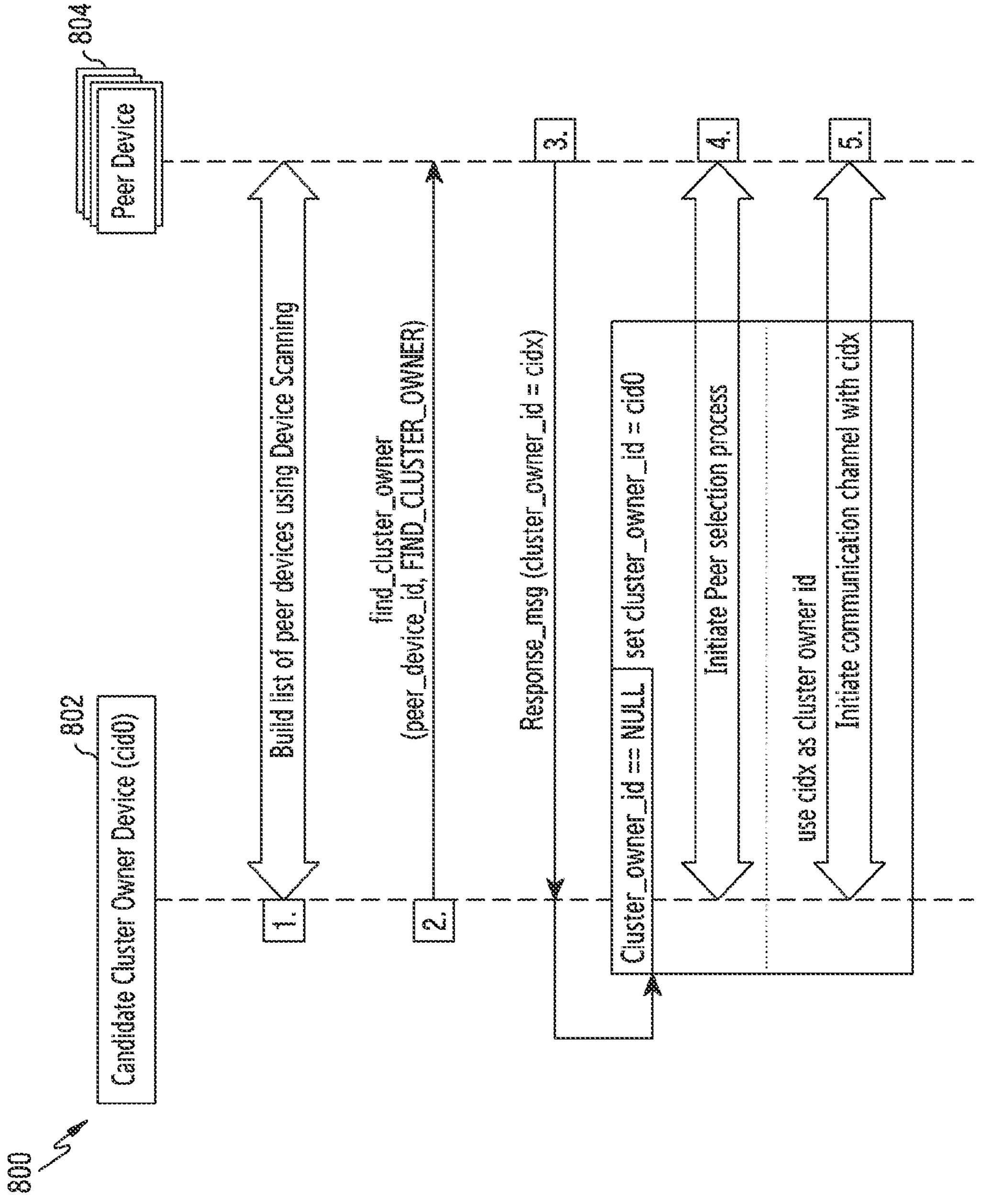
FIG. 8 is a signal flow diagram illustrating example selection of a cluster owner in a wireless network, according to various embodiments.

FIG. 8 is a signal flow diagram 800 illustrating example selection of a cluster owner in a wireless network, according to various embodiments. Owner identification process is followed by all the 5G supported devices. All the 5G supported devices are candidates to be the cluster owner. As can be seen in FIG. 8, when a new candidate cluster owner device 802 which is a 5G supported device arrives in the user environment of the cluster, then its scan for all the wireless devices in the user environment in step 1. Candidate cluster owner device 802 may check for the existing cluster owner of the cluster as shown in step 2. After receiving the response in step 3, where a response indicating the value of the cluster owner is provided. If the value of the cluster owner is 'NULL' then the candidate cluster owner device 802 will be assigned the status of cluster owner for the corresponding cluster. However, at step 4, if the value of the cluster owner is not 'NULL' the candidate cluster owner device 802 may starts with peer selection process for the cluster. At step 5, candidate cluster owner device 802 will register itself as a peer to the existing cluster owner and initiate the communication channel.

Figure 10A:
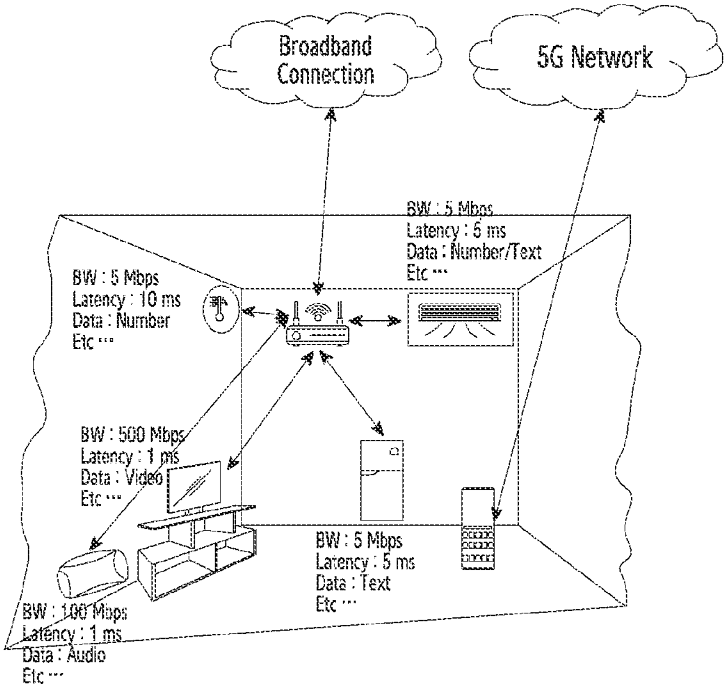
FIG.10A (RELATED ART)
FIGS. 10A and 10B are diagrams illustrating an example comparative scenario for providing network access to wireless devices, according to various embodiments.
Figure 10B:
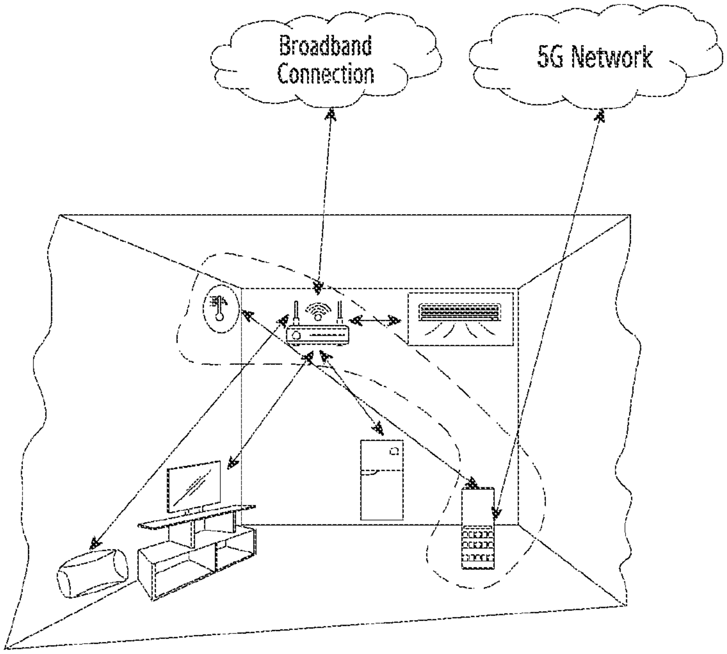

FIGS. 10A and 10B are diagrams illustrating an example comparative scenario for providing network access to wireless devices, according to various embodiments. FIG. 10A illustrates an example diagram for providing network access to a plurality of wireless devices in the user environment, as per the conventional technique. In FIG. 10A, multiple devices like AC, TV, Fridge, smoke sensor are connected with the broadband network connection. As can be seen each device has it own bandwidth and latency requirements which are different from each other. The smoke sensor have the low bandwidth and the low latency requirement when compared with the other devices. However, the broadband connection may not be able to provide such low latency and further can not use the network slices. As such no SLA is guaranteed to the smoke sensor for the low latency connectivity Therefore, broadband network connection is not able to assign specific network resources as per the requirement of each of the wireless devices connected to the broadband network connection. On the other hand, the 5G supported mobile phone which is connected to the 5G network is in the idle state and not using allocated network slice. So, such scenario is contributing towards the wastage of the network resources.

However, as shown in FIG. 10B, using the method and systems disclosed by the present disclosure, the 5G supported mobile phone forms a cluster with smoke sensor based on its low latency requirements, is added to the low latency cluster. Thus, 5G network slice with low latency is now being efficiently utilized by the smoke sensor. Further, SLA can be used by the smoke sensor via the unutilized 5G network slice available to smart phone.

Figure 11:
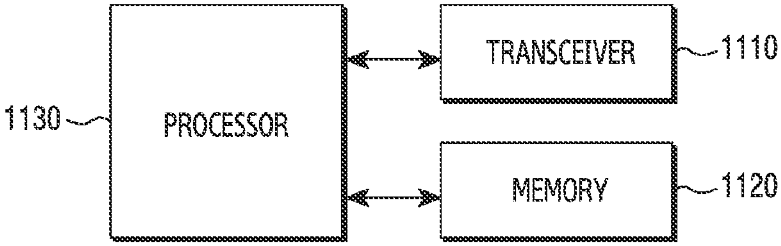
FIG. 11 is a block diagram illustrating an example configuration of a user equipment (UE or terminal) according to various embodiments.

FIG. 11 is a block diagram illustrating an example configuration of a user equipment (UE or terminal) according to various embodiments.

As shown in FIG. 11, the UE according to an embodiment may include a transceiver (e.g., including various circuitry) 1110, a memory 1120, and a processor (e.g., including processing circuitry) 1130. The transceiver 1110, the memory 1120, and the processor 1130 of the UE may operate according to a communication method of the UE described above. However, the components of the UE are not limited thereto. For example, the UE may include more or fewer components than those described above. In addition, the processor 1130, the transceiver 1110, and the memory 1120 may be implemented as a single chip. Also, the processor 1130 may include at least one processor. Furthermore, the UE of FIG. 11 corresponds to the UE of FIG. 1.

The transceiver 1110 collectively refers to a UE receiver and a UE transmitter, and may transmit/receive a signal to/from a base station or a network entity. The signal transmitted or received to or from the base station or a network entity may include control information and data. The transceiver 1110 may include a RF transmitter for up-converting and amplifying a frequency of a transmitted signal, and a RF receiver for amplifying low-noise and down-converting a frequency of a received signal. However, this is only an example of the transceiver 1110 and components of the transceiver 1110 are not limited to the RF transmitter and the RF receiver.

The transceiver 1110 may receive and output, to the processor 1130, a signal through a wireless channel, and transmit a signal output from the processor 1130 through the wireless channel.

The memory 1120 may store a program and data required for operations of the UE. Also, the memory 1120 may store control information or data included in a signal obtained by the UE. The memory 1120 may be a storage medium, such as read-only memory (ROM), random access memory (RAM), a hard disk, a CD-ROM, and a DVD, or a combination of storage media.

The processor 1130 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 1130 may, for example, control a series of processes such that the UE operates as described above. For example, the transceiver 1110 may receive a data signal including a control signal transmitted by the base station or the network entity, and the processor 1130 may determine a result of receiving the control signal and the data signal transmitted by the base station or the network entity.

Figure 12:
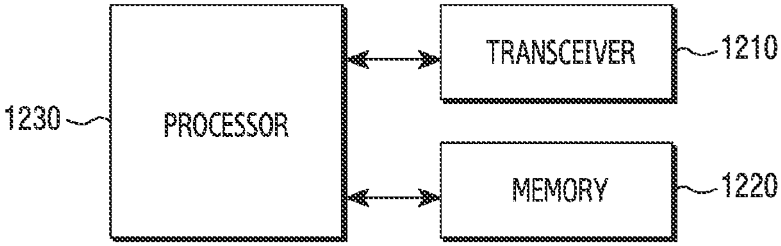
FIG. 12 is a block diagram illustrating an example configuration of a base station (BS) according to various embodiments.

FIG. 12 is a block diagram illustrating an example configuration of a base station (BS) according to various embodiments.

As shown in FIG. 12, the base station according to an embodiment may include a transceiver (e.g., including various circuitry) 1210, a memory 1220, and a processor (e.g., including processing circuitry) 1230. The transceiver 1210, the memory 1220, and the processor 1230 of the base station may operate according to a communication method of the base station described above. However, the components of the base station are not limited thereto. For example, the base station may include more or fewer components than those described above. In addition, the processor 1230, the transceiver 1210, and the memory 1220 may be implemented as a single chip. Also, the processor 1230 may include at least one processor.

The transceiver 1210 collectively refers to a base station receiver and a base station transmitter, and may transmit/receive a signal to/from a terminal (UE) or a network entity. The signal transmitted or received to or from the terminal or a network entity may include control information and data. The transceiver 1210 may include a RF transmitter for up-converting and amplifying a frequency of a transmitted signal, and a RF receiver for amplifying low-noise and down-converting a frequency of a received signal. However, this is only an example of the transceiver 1210 and components of the transceiver 1210 are not limited to the RF transmitter and the RF receiver.

The transceiver 1210 may receive and output, to the processor 1230, a signal through a wireless channel, and transmit a signal output from the processor 1230 through the wireless channel.

The memory 1220 may store a program and data required for operations of the base station. Also, the memory 1220 may store control information or data included in a signal obtained by the base station. The memory 1220 may be a storage medium, such as read-only memory (ROM), random access memory (RAM), a hard disk, a CD-ROM, and a DVD, or a combination of storage media.

The processor 1230 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 1230 may, for example, control a series of processes such that the base station operates as described above. For example, the transceiver 1210 may receive a data signal including a control signal transmitted by the terminal, and the processor 1230 may determine a result of receiving the control signal and the data signal transmitted by the terminal.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

In the described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed herein can be used, these features can be used in any other suitable system.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In various embodiments, the described elements may be configured to reside on a tangible, persistent, addressable storage medium and may be configured to execute on one or more processors. These functional elements may in various embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this disclosure, the term "comprising" or "comprises" may refer, for example, to including the component(s) specified but not to the exclusion of the presence of others.

All of the features disclosed in this disclosure (including any accompanying claims, abstract and drawings), and/or all of the steps of any method or process so disclosed, may be combined in any combination, except combinations where at least some of such features and/or steps are mutually exclusive.

Each feature disclosed in this disclosure (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this disclosure (including any accompanying claims, abstract and drawings), or to any novel one, or any novel combination, of the steps of any method or process so disclosed.

Referring to the technical abilities and effectiveness of the above-disclosed method and system, the above-disclosed method and system provides the technical improvements like the dynamic network slicing ensures that each cluster receives a tailored network slice optimized for its characteristics, thereby maximizing and/or improving network resource utilization and further providing an improved user experience. Further, one or more techniques described in the above-disclosed method can be applied by dynamically assigning the network slices to the clusters of the wireless devices and by detecting the services that are running on the wireless devices in the cluster which may results in more efficient utilization of the network and further the wireless devices can communicate with each other more effectively.

Although specific units/modules have been illustrated in the figures and described above, it should be understood that the system 200 may include other hardware modules or software modules or combinations as may be required for performing various functions.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Those skilled in the art will appreciate that the operations described herein in the present disclosure may be carried out in other specific ways than those set forth herein without departing from essential characteristics of the present disclosure. The embodiments are therefore to be construed in all aspects as illustrative and not restrictive. The scope of the disclosure should be determined by the detailed description, including the appended claims, and all changes coming within the meaning of the appended claims are intended to be embraced therein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the disclosure or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A first terminal in a wireless communication system, the first terminal comprising:
- a transceiver; and
- a controller coupled with the transceiver and configured to:
- identify a plurality of terminals in a user environment,
- determine a first cluster with the first terminal as a cluster owner based on a first service requirement of the first terminal,
- assign a first network slice among a plurality of network slices available in the user environment to the first cluster,
- determine that a new service or a new application is running on a second terminal included in the first cluster, and
- assign a new network slice to the second terminal.

2. The first terminal of claim 1,
- wherein each of the plurality of terminals corresponds to a first type of terminal or a second type of terminal,
- wherein the first type of terminal supports at least one of fifth generation (5G) technology, beyond 5G technology or network functions virtualization (NFV),
- wherein the second type of terminal supports at least one of fourth generation (4G) network, third generation (3G) network, second generation (2G) network, long-term evolution (LTE) network, voice over LTE (VoLTE) network, broadband network, short-range wireless communication or infrared communication,
- wherein the first terminal corresponds to the first type of terminal.

3. The first terminal of claim 1, wherein each of the plurality of terminals communicates with each other using short-range wireless communication or neighbor access networking (NAN) protocol.

4. The first terminal of claim 1, wherein the first cluster comprises terminals requiring the first service requirement.

5. The first terminal of claim 1,
- wherein the first service requirement comprises quality of service (QoS) requirements and security requirements, and
- wherein the QoS requirements and the security requirements relate to a service or an application running on the first terminal.

6. The first terminal of claim 1, wherein the first network slice fulfills the first service requirement.

7. The first terminal of claim 1, wherein the controller is further configured to identify a QoS change of the second terminal.

8. The first terminal of claim 1, wherein the controller is further configured to receive, from the second terminal, information that the first network slice does not fulfill service requirements of the second terminal.

9. The first terminal of claim 1, wherein the controller is further configured to:
- determine whether a second network slice assigned to a second cluster in the user environment fulfills service requirements of the second terminal,
- based on the second network slice fulfilling the service requirements of the second terminal, assign the second network slice as the new network slice to the second terminal, and
- based on the second network slice not fulfilling the service requirements of the second terminal, assign a third network slice fulfilling the service requirements of the second terminal among a plurality of network slices available in the user environment, as the new network slice to the second terminal.

10. A method performed by a first terminal in a wireless communication system, the method comprising:

identifying a plurality of terminals in a user environment;

determining a first cluster with the first terminal as a cluster owner based on a first service requirement of the first terminal;

assigning a first network slice among a plurality of network slices available in the user environment to the first cluster;

determining that a new service is executing on a second terminal included in the first cluster; and assigning a new network slice to the second terminal.

11. A second terminal in a wireless communication system, the second terminal comprising:

a transceiver; and a controller coupled with the transceiver and configured to:

identify a first terminal as a cluster owner of a first cluster, among a plurality of terminals in a user environment, wherein a first service requirement of the first terminal is required for a service or an application running on the second terminal and wherein a first network slice among a plurality of network slices available in the user environment is assigned to the first cluster, and execute a new service or a new application, wherein a new network slice is assigned to the second terminal.

12. The second terminal of claim 11, wherein each of the plurality of terminals corresponds to a first type of terminal or a second type of terminal, wherein the first type of terminal supports at least one of fifth generation (5G) technology, beyond 5G technology or network functions virtualization (NFV), wherein the second type of terminal supports at least one of fourth generation (4G) network, third generation (3G) network, second generation (2G) network, long-term evolution (LTE) network, voice over LTE (VoLTE) network, broadband network, short-range wireless communication or infrared communication, wherein the first terminal corresponds to the first type of terminal.

13. The second terminal of claim 11, wherein each of the plurality of terminals communicates with each other using short-range wireless communication or neighbor access networking (NAN) protocol.

14. The second terminal of claim 11, wherein the first cluster comprises terminals requiring the first service requirement.

15. The second terminal of claim 11, wherein the first service requirement comprises quality of service (QoS) requirements and security requirements, and wherein the QoS requirements and the security requirements relate to a service or an application running on the first terminal.

16. The second terminal of claim 11, wherein the first network slice fulfills the first service requirement.

17. The second terminal of claim 11, wherein the new service or the new application relates to a QoS change of the second terminal.

18. The second terminal of claim 11, wherein the controller is further configured to transmit, to the first terminal, information that the first network slice does not fulfill service requirements of the second terminal.

19. The second terminal of claim 18, wherein:

a second network slice assigned to a second cluster in the user environment is assigned to the second terminal, based on the second network slice fulfilling the service requirements of the second terminal, and a third network slice fulfilling the service requirements of the second terminal among a plurality of network slices available in the user environment is assigned to the second terminal, based on the second network slice not fulfilling the service requirements of the second terminal.

20. A method performed by a second terminal in a wireless communication system, the method comprising:

identifying a first terminal as a cluster owner of a first cluster, among a plurality of terminals in a user environment, wherein a first service requirement of the first terminal is required for a service or an application running on the second terminal and wherein a first network slice among a plurality of network slices available in the user environment is assigned to the first cluster, and executing a new service or a new application, wherein a new network slice is assigned to the second terminal.

* * * * *